(12) United States Patent
Chen

(10) Patent No.: US 9,929,661 B2
(45) Date of Patent: Mar. 27, 2018

(54) SWITCHING POWER SUPPLY APPARATUS

(71) Applicant: FUJI ELECTRIC CO., LTD., Kawasaki-shi, Kanagawa (JP)

(72) Inventor: Jian Chen, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/333,576

(22) Filed: Oct. 25, 2016

(65) Prior Publication Data

US 2017/0155333 A1    Jun. 1, 2017

(30) Foreign Application Priority Data

Dec. 1, 2015  (JP) ................. 2015-234552

(51) Int. Cl.
| | | |
|---|---|---|
| *H02M 3/335* | (2006.01) | |
| *H02M 1/08* | (2006.01) | |
| *H02M 1/36* | (2007.01) | |
| *H02M 1/42* | (2007.01) | |
| *H02M 3/337* | (2006.01) | |
| *H02M 1/00* | (2006.01) | |

(52) U.S. Cl.
CPC ......... *H02M 3/33553* (2013.01); *H02M 1/08* (2013.01); *H02M 1/36* (2013.01); *H02M 1/42* (2013.01); *H02M 3/3376* (2013.01); *H02M 2001/0009* (2013.01); *H02M 2001/0032* (2013.01); *H02M 2001/0058* (2013.01); *Y02B 70/1491* (2013.01); *Y02B 70/16* (2013.01)

(58) Field of Classification Search
CPC .......... Y02B 70/16; H02M 2001/0032; H02M 3/33523; H02M 2001/0035; H02M 3/33553; H02M 1/08; H02M 1/36; H02M 1/42; H02M 2001/0009
See application file for complete search history.

(56) References Cited

U.S. PATENT DOCUMENTS

2012/0307530 A1   12/2012  Miyazaki
2016/0099639 A1*   4/2016  Leisten ............... H02M 3/3376
                                                    323/271

FOREIGN PATENT DOCUMENTS

WO    WO-2011/065024 A1   6/2011

* cited by examiner

*Primary Examiner* — Henry Lee, III
(74) *Attorney, Agent, or Firm* — Rabin & Berdo, P.C.

(57) ABSTRACT

In a standby signal generation circuit, a first comparator compares a FB voltage fed back from a secondary side with a first reference voltage, and a second comparator compares a signal indicative of the magnitude of a load with a second reference voltage. When the FB voltage falls under the first reference voltage, the first comparator sets an RS flip-flop via a first delay circuit. At this time, if the signal is lower than the second reference voltage and a reset signal is not inputted to the RS flip-flop, it is determined, based on a standby control signal from the load, that an output voltage of a switching power supply apparatus has fallen. Accordingly, a standby signal indicative of standby mode is outputted via a second delay circuit. If the signal transiently exceeds the second reference voltage, the standby signal is set to normal mode.

9 Claims, 10 Drawing Sheets

SWITCHING POWER SUPPLY APPARATUS

CROSS-REFERENCE TO RELATED APPLICATION

This application is based upon and claims the benefit of priority of the prior Japanese Patent Application No. 2015-234552, filed on Dec. 1, 2015, the entire contents of which are incorporated herein by reference.

BACKGROUND OF THE INVENTION

1. Field of the Invention

The embodiment discussed herein is related to a switching power supply apparatus and, more particularly, to a switching power supply apparatus which includes a current resonance DC-DC switching converter and which switches an output voltage by receiving a standby signal.

2. Background of the Related Art

Because current resonance DC-DC switching converters are suitable for increasing efficiency or reducing thickness, they are widely adopted in switching power supply apparatus of television sets and the like. Some loads of switching power supply apparatus operate in normal mode at normal usage time and operate in standby mode at standby time. Such a load transmits a standby control signal to a switching power supply apparatus when it is in standby mode. The switching power supply apparatus which receives the standby control signal exercises control so as to supply to the load minimum power which the load needs to operate in the standby mode (see, for example, International Publication Pamphlet No. WO2011/065024).

FIG. 9 is a circuit diagram which illustrates an example of the structure of a conventional switching power supply apparatus. FIG. 10 illustrates an example of the structure of a control IC. In the following description the same numeral may be used for representing the name of a terminal and a voltage, a signal, or the like at the terminal.

As illustrated in FIG. 9, with a conventional switching power supply apparatus an input capacitor C1 is connected to input terminals 10$p$ and 10$n$. An input DC voltage Vi is applied to the input capacitor C1. The input voltage Vi may be a DC voltage obtained by rectifying and smoothing an AC source voltage or a constant high DC voltage generated by a power factor correction circuit.

Furthermore, a circuit including a high-side switching element Q1 and a low-side switching element Q2 connected in series is connected to the input terminals 10$p$ and 10$n$ to make up a half bridge circuit. In this example, n-channel metal-oxide-semiconductor field-effect transistors (MOSFETs) are used as the switching elements Q1 and Q2.

A connection point common to the switching elements Q1 and Q2 is connected to one end of a primary winding P1 of a transformer T1 and the other end of the primary winding P1 is connected to a ground via a resonance capacitor C5. The magnetizing inductance of the primary winding P1 of the transformer T1, leakage inductance between the primary winding P1 and secondary windings S1 and S2, and the resonance capacitor C5 make up a resonance circuit.

One end of the secondary winding S1 of the transformer T1 is connected to an anode terminal of a diode D3. One end of the secondary winding S2 of the transformer T1 is connected to an anode terminal of a diode D4. Cathode terminals of the diodes D3 and D4 are connected to a positive electrode terminal of an output capacitor C6 and an output terminal 11$p$. A negative electrode terminal of the output capacitor C6 is connected to a connection point common to the secondary windings S1 and S2 and an output terminal 11$n$. The secondary windings S1 and S2, the diodes D3 and D4, and the output capacitor C6 make up a circuit which rectifies and smooths an AC voltage generated in the secondary windings S1 and S2 and which converts it to a DC voltage. This circuit is an output circuit of the switching power supply apparatus. The output terminals 11$p$ and 11$n$ are connected to a load (not illustrated).

The output terminal 11$p$ is connected via a resistor R8 to an anode terminal of a light-emitting diode of a photocoupler PC1. A cathode terminal of the light-emitting diode is connected to a cathode terminal of a shunt regulator SR1. A resistor S6 is connected to the anode terminal and the cathode terminal of the light-emitting diode. That is to say, the resistor S6 is connected in parallel with the light-emitting diode. An anode terminal of the shunt regulator SR1 is connected to the output terminal 11$n$. The shunt regulator SR1 has a reference terminal connected to a connection point of resistors R9 and R10 connected in series between the positive electrode terminal and the negative electrode terminal of the output capacitor C6. A circuit made up of a resistor R7 and a capacitor C7 connected in series is connected between the reference terminal and the cathode terminal of the shunt regulator SR1. The shunt regulator SR1 causes a current corresponding to the difference between an internal reference voltage and a voltage obtained by dividing an output voltage Vo (voltage across the output capacitor C6) to flow to the light-emitting diode. A collector terminal of a phototransistor of the photocoupler PC1 is connected to a FB terminal of a control integrated circuit (IC) 12. An emitter terminal of the phototransistor is connected to the ground. A capacitor C2 is connected to the collector terminal and the emitter terminal of the phototransistor. That is to say, the capacitor C2 is connected in parallel with the phototransistor. The photocoupler PC1 and the shunt regulator SR1 make up a feedback circuit which feeds back an error between the output voltage Vo and the reference voltage to the control IC 12.

The control IC 12 has a VH terminal connected to a positive electrode terminal of the input capacitor C1 and a GND terminal connected to the ground. Furthermore, the control IC 12 has a HO terminal connected via a resistor R1 to a gate terminal of the high-side switching element Q1 and a LO terminal connected via a resistor R2 to a gate terminal of the low-side switching element Q2. In addition, the control IC 12 has a VB terminal, a VS terminal, a STB terminal, a CA terminal, an IS terminal, and a VCC terminal. A capacitor C4 is connected between the VB terminal and the VS terminal. The VS terminal is connected to the connection point common to the switching elements Q1 and Q2. One end of a capacitor Cca is connected to the CA terminal. The other end of the capacitor Cca is connected to the ground. The IS terminal is connected to a connection point common to a capacitor Cs and a resistor Rs. A circuit made up of the capacitor Cs and the resistor Rs connected in series is connected in parallel with the resonance capacitor C5. The circuit made up of the capacitor Cs and the resistor Rs connected in series is a shunt circuit which shunts a resonance current. A current shunted by the shunt circuit is converted to a voltage signal by the resistor Rs for current detection and is inputted to the IS terminal of the control IC 12 as a signal indicative of the resonance current. The VCC terminal is connected to a positive electrode terminal of a capacitor C3 and a negative electrode terminal of the capacitor C3 is connected to the ground. Furthermore, the VCC terminal is connected to an anode terminal of a diode D2 and a cathode terminal of the diode D2 is connected to the VB terminal. The VCC terminal is connected via a diode to an auxiliary winding of the transformer T1 (not illustrated for the sake of the simplicity of FIG. 9). After the switching power supply apparatus is started, the capacitor C3 is charged by a voltage generated in the auxiliary winding and is used as a power source for the control IC 12.

Furthermore, the switching power supply apparatus receives a standby control signal nml from the load (not illustrated). That is to say, one end of a resistor R11 is connected to the connection point of the resistors R9 and R10 which make up a circuit for dividing the output voltage Vo. The other end of the resistor R11 is connected to a drain terminal of a transistor Q3. A source terminal of the transistor Q3 is connected to the ground. A gate terminal of the transistor Q3 is an input terminal for the standby control signal nml. The resistor R11 and the transistor Q3 make up a mode switching circuit which receives the standby control signal nml and which switches the output voltage Vo by switching a division ratio of the output voltage Vo.

Furthermore, the output terminal 11p is connected via a resistor R12 to an anode terminal of a light-emitting diode of a photocoupler PC2. A cathode terminal of the light-emitting diode is connected to a drain terminal of a transistor Q4. A source terminal of the transistor Q4 is connected to the ground. A gate terminal of the transistor Q4 is an input terminal for the standby control signal nml. A collector terminal of a phototransistor of the photocoupler PC2 is connected to the STB terminal of the control IC 12. An emitter terminal of the phototransistor is connected to the ground. A capacitor C9 is connected to the collector terminal and the emitter terminal of the phototransistor. That is to say, the capacitor C9 is connected in parallel with the phototransistor. When the switching power supply apparatus is made to operate in normal mode, the standby control signal nml is at a high (H) level. When the switching power supply apparatus is made to operate in standby mode, the standby control signal nml is at a low (L) level. Accordingly, when the standby control signal nml is at a high level, the resistors R10 and R11 are connected in parallel. In addition, the light-emitting diode of the photocoupler PC2 emits light to turn on the phototransistor. By doing so, the STB terminal of the control IC 12 is made a ground level. Conversely, when the standby control signal nml is at a low level, the resistor R11 is excepted from a circuit. In addition, the light-emitting diode of the photocoupler PC2 goes out to turn off the phototransistor.

As illustrated in FIG. 10, the control IC 12 includes a start circuit 21 whose input terminal is connected to the VH terminal. An output terminal of the start circuit 21 is connected to the VCC terminal and a low-side drive circuit 25. An input terminal of an oscillation circuit 22 is connected to the FB terminal and an output terminal of the oscillation circuit 22 is connected to a controller 23. A high-side output terminal of the controller 23 is connected to an input terminal of a high-side drive circuit 24 and a low-side output terminal of the controller 23 is connected to an input terminal of the low-side drive circuit 25. An output terminal of the high-side drive circuit 24 is connected to the HO terminal and an output terminal of the low-side drive circuit 25 is connected to the LO terminal. The high-side drive circuit 24 is also connected to the VB terminal for a high-side power source and the VS terminal which is a high-side reference potential. The CA terminal and the IS terminal are connected to a load detection circuit 26. The load detection circuit 26 is connected to the controller 23. Furthermore, the control IC 12 includes a standby signal generation circuit 27 whose input terminal is connected to the STB terminal. An output terminal of the standby signal generation circuit 27 is connected to the controller 23. A standby signal sdymo generated by the standby signal generation circuit 27 is supplied to the controller 23.

With the switching power supply apparatus having the above structure, before the control IC 12 begins switching control, the start circuit 21 of the control IC 12 which receives the input voltage Vi at the VH terminal supplies a starting current to the capacitor C3 to charge the capacitor C3. After the capacitor C3 is charged, its voltage VCC is supplied to the VCC terminal and the low-side drive circuit 25. After the control IC 12 begins switching control, the voltage VCC is supplied from the auxiliary winding of the transformer T1.

It is assumed that the standby control signal nml supplied from the load is at a high level indicative of the normal mode. Then the transistor Q3 is turned on. As a result, the resistors R10 and R11 are connected in parallel. The transistor Q4 is also turned on and the STB terminal of the control IC 12 is made a ground level by the photocoupler PC2. Because the STB terminal is made the ground level, the standby signal generation circuit 27 supplies a low-level standby signal sdymo to the controller 23.

The control IC 12 exercises control so as to alternately turn on and off the switching elements Q1 and Q2. By doing so, the output voltage Vo of the output circuit on the side of the secondary windings S1 and S2 of the transformer T1 is kept at a determined value. That is to say, the shunt regulator SR1 detects the output voltage Vo by the use of an output of a voltage division circuit made up of the resistors R9 and a circuit made up of the resistors R10 and R11 connected in parallel, and outputs a current corresponding to an error between a detected value and the determined value (internal reference voltage of the shunt regulator SR1). The error current is fed back to the FB terminal of the control IC 12 by the photocoupler PC1. In the control IC 12, the oscillation circuit 22 adjusts an oscillation frequency according to a signal FB at the FB terminal and the controller 23 supplies to the high-side drive circuit 24 and the low-side drive circuit 25 a signal which makes the switching elements Q1 and Q2 turn on and off alternately. By doing so, the switching elements Q1 and Q2 are on-off controlled. As a result, the amount of power induced on the secondary side of the transformer T1 is adjusted and the output voltage Vo is kept at the determined value.

Next, when the standby control signal nml supplied from the load becomes a low level indicative of the standby mode, the transistors Q3 and Q4 are turned off. As a result, the STB terminal of the control IC 12 becomes a high level. Accordingly, the standby signal generation circuit 27 outputs a high-level standby signal sdymo and the control IC 12 is switched from the normal mode to the standby mode. The output voltage Vo outputted at the time of the control IC 12 being in the standby mode is switched to a voltage lower than a voltage outputted at the time of the control IC 12 being in the normal mode. This output voltage Vo is detected by the shunt regulator SR1 by the use of an output of a voltage division circuit in which the resistor R11 is excepted, and an error voltage is fed back to the control IC 12. By doing so, the output voltage Vo is kept at a determined value smaller than the determined value at the time of the control IC 12 being in the normal mode. By decreasing the output voltage Vo at the time of the control IC 12 being in the standby mode, the efficiency of the switching power supply apparatus is improved and the standby power consumption of a system including the load is reduced.

With the above switching power supply apparatus a signal transmission circuit including an element which performs transmission in an electrically insulated state is needed for transmitting from the secondary side to a control IC on the primary side a standby control signal supplied from a load. The control IC needs a specialized terminal for receiving the standby control signal. This raises the costs.

SUMMARY OF THE INVENTION

According to an aspect, there is provided a switching power supply apparatus including a first switching element and a second switching element connected in series, a circuit made up of a resonance reactor and a resonance capacitor connected in series to each other and connected in parallel with the first switching element or the second switching element, a control circuit that controls an output voltage to be supplied to a load by changing an operating frequency at which switching of the first switching element and the second switching element is performed, a feedback circuit that feeds back to the control circuit an error between the output voltage and a reference voltage, and a mode switching circuit that switches the output voltage to a first voltage in a normal mode or a second voltage in a standby mode lower than the first voltage by a standby control signal supplied from the load, the control circuit including a standby signal generation circuit that monitors the operating frequency and a load signal generated from a resonance current and reflecting a magnitude of the load and that generates a standby signal for performing switching of the normal mode or the standby mode according to the operating frequency and the load signal.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

An embodiment will now be described in detail with reference to the accompanying drawings.

Figure 1:
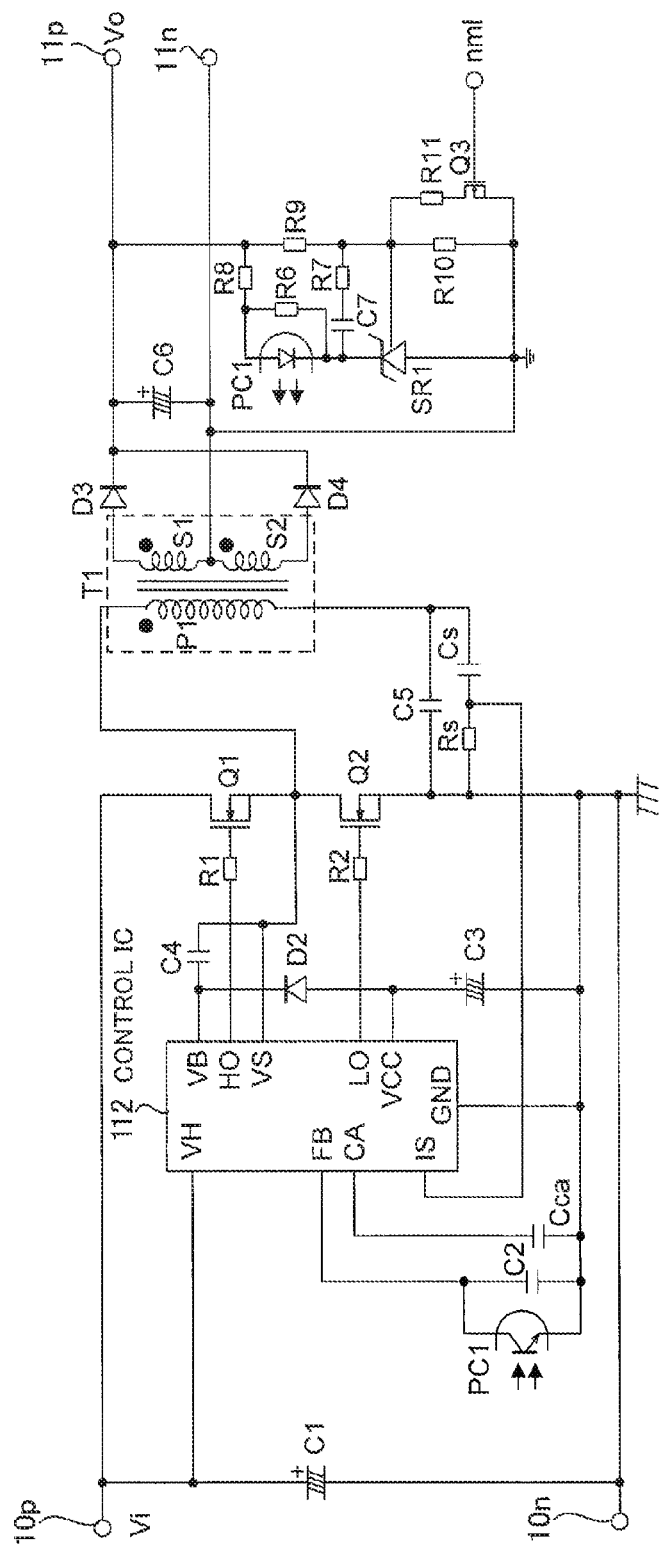
FIG. 1 is a circuit diagram illustrative of an example of the structure of a switching power supply apparatus according to an embodiment.
Figure 2:
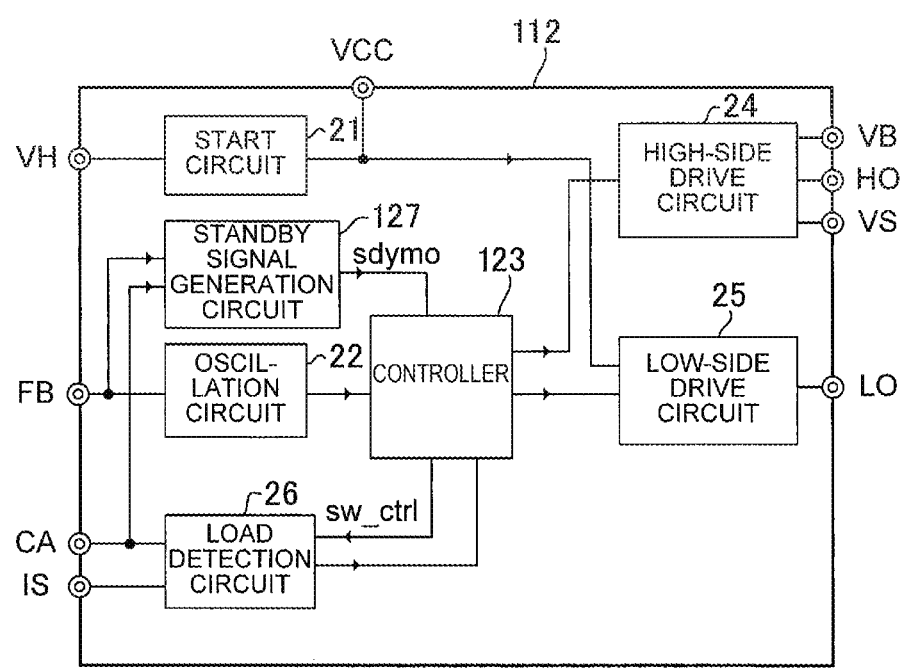
FIG. 2 illustrates an example of the structure of a control IC.
Figure 9:
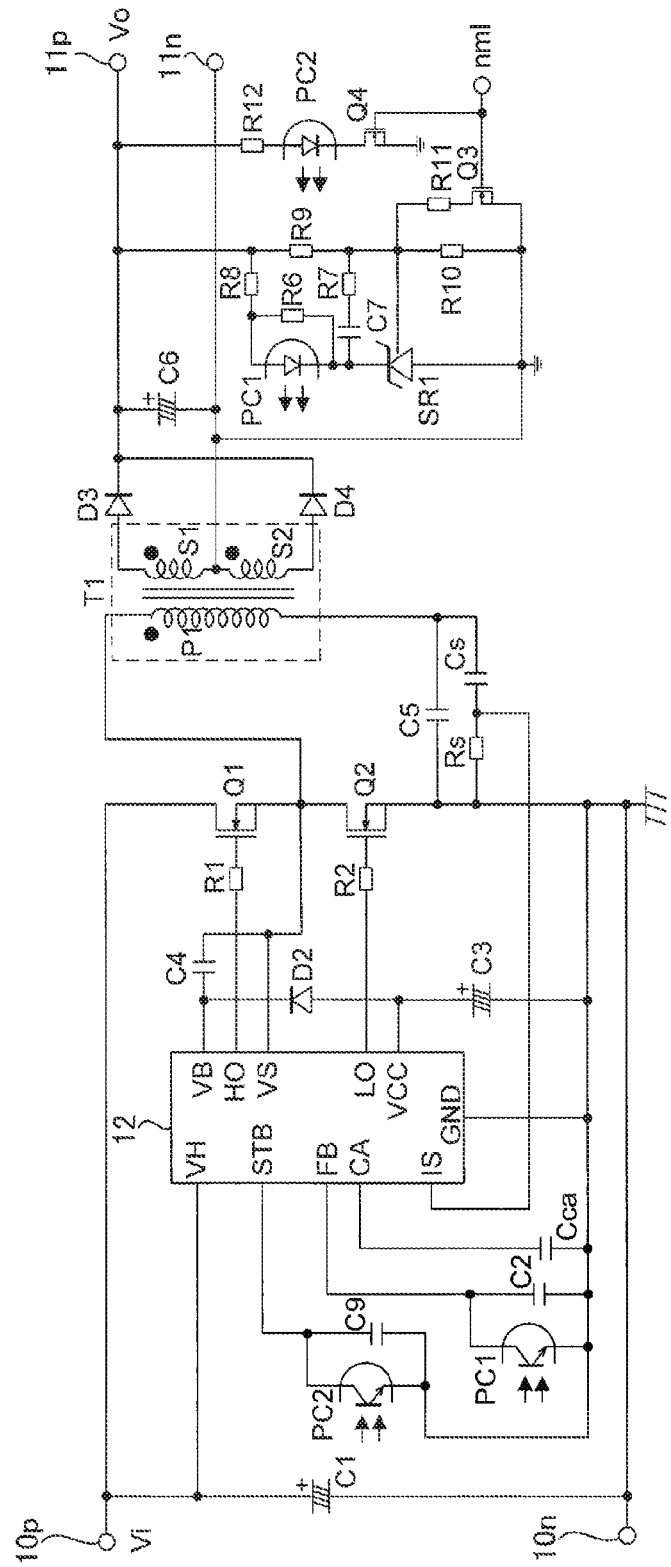
FIG. 9 is a circuit diagram which illustrates an example of the structure of a conventional switching power supply apparatus.
Figure 10:
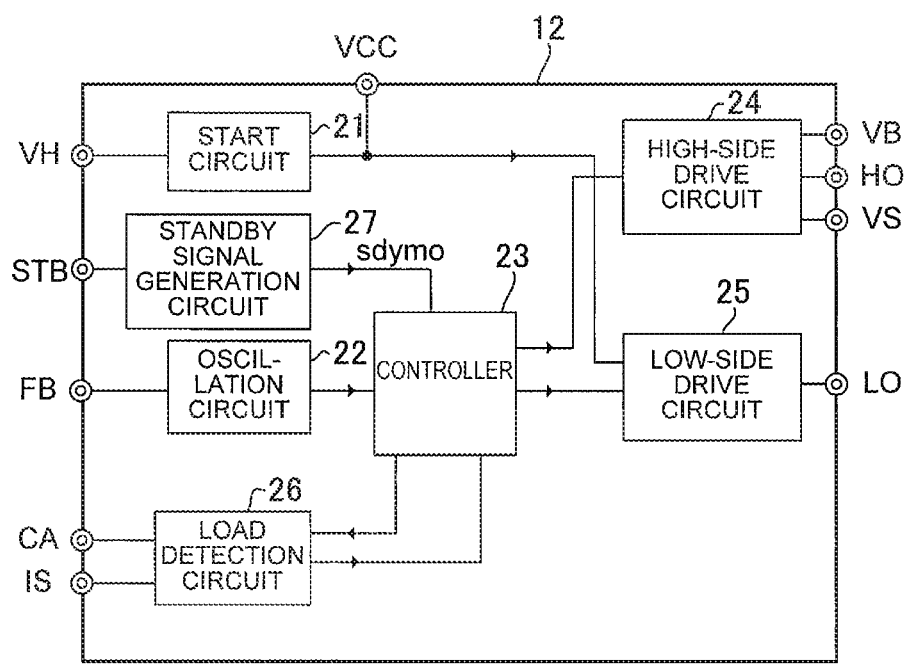
FIG. 10 illustrates an example of the structure of a control IC.

FIG. 1 is a circuit diagram illustrative of an example of the structure of a switching power supply apparatus according to an embodiment. FIG. 2 illustrates an example of the structure of a control IC. Components in FIGS. 1 and 2 which are the same as those illustrated in FIGS. 9 and 10 are marked with the same numerals and detailed descriptions of them will be omitted. Furthermore, in the following description the same numeral may be used for representing the name of a terminal and a voltage, a signal, or the like at the terminal.

A switching power supply apparatus according to the embodiment illustrated in FIG. 1 differs from the conventional switching power supply apparatus illustrated in FIG. 9 in that the switching power supply apparatus according to FIG. 1 does not include a circuit which transmits the standby control signal nml inputted on the secondary side to the control IC 112 on the primary side via the photocoupler PC2. Therefore, a control IC 112 included in a switching power supply apparatus according to the embodiment illustrated in FIG. 1 does not have a STB terminal used for receiving a standby control signal.

That is to say, as illustrated in FIG. 1, the switching power supply apparatus according to the embodiment includes the control IC 112 on the primary side of a transformer T1 which on-off controls switching elements Q1 and Q2. Control is exercised by feeding back the voltage value of an output voltage Vo on the secondary side of the transformer T1 to the control IC 112 via a photocoupler PC1 to keep the output voltage Vo on the secondary side constant. Furthermore, a resonance current which passes through a resonance circuit made up of the transformer T1 and a resonance capacitor C5 is shunted by a shunt circuit made up of a capacitor Cs and a resistor Rs and is inputted to the control IC 112. By doing so, the control IC 112 exercises control according to the state of a load. By receiving a standby control signal nml on the secondary side of the transformer T1 and changing the voltage division ratio of the output voltage Vo, the voltage value of the output voltage Vo is switched. For example, control is exercised so that the output voltage Vo will be 13 volts (V) in normal mode in which the standby control signal nml is at a high level and so that the output voltage Vo will be about 8 V in standby mode in which the standby control signal nml is at a low level.

The control IC 112 includes the same components that are included in the conventional control IC 12 illustrated in FIG. 10. That is to say, the control IC 112 includes a start circuit 21, an oscillation circuit 22, a controller 123, a high-side drive circuit 24, a low-side drive circuit 25, a load detection circuit 26, and a standby signal generation circuit 127. However, the control IC 112 differs from the conventional control IC 12 illustrated in FIG. 10 only in that it does not have a STB terminal. Therefore, the standby signal generation circuit 127 inputs signals at a FB terminal and a CA terminal and generates a standby signal sdymo from the signals at the FB terminal and the CA terminal.

How the standby signal generation circuit 127 determines on the primary side without directly receiving the standby control signal nml whether the load is in the normal mode or the standby mode will now be described.

First, the output voltage Vo is switched from a high voltage to a low voltage at the time of a shift from the normal mode to the standby mode. Furthermore, the load is heavy in the normal mode and is light in the standby mode.

Therefore, when the output voltage Vo falls and the load is light, the standby signal generation circuit 127 determines that the load is in the standby mode. Conversely, when the load is not light, the standby signal generation circuit 127 determines that the standby mode is canceled and that the load returns to the normal mode. Next, how the standby signal generation circuit 127 determines a fall in the output voltage Vo and a light load will be described.

Figure 3:
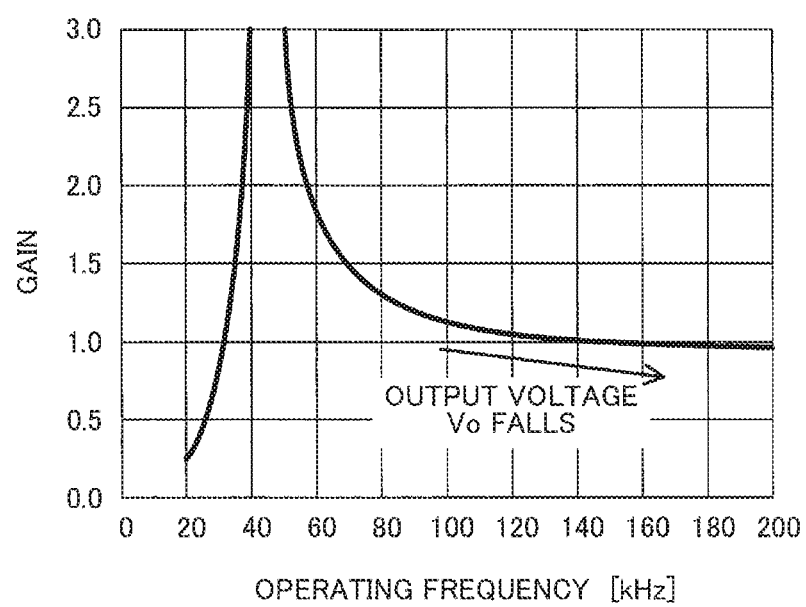
FIG. 3 indicates the gain characteristic of a current resonance converter.
Figure 4:
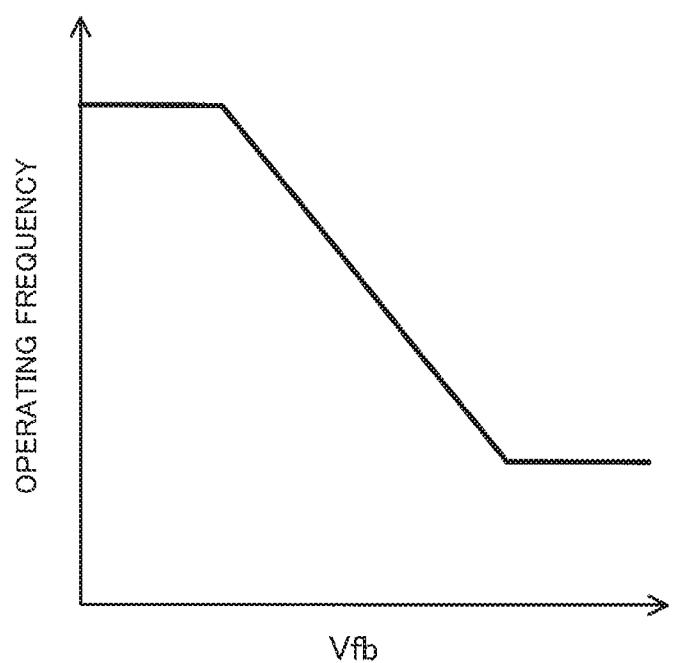
FIG. 4 indicates the relationship between a FB voltage and an operating frequency.

FIG. 3 indicates the gain characteristic of a current resonance converter. FIG. 4 indicates the relationship between a FB voltage and an operating frequency. In FIG. 3, a vertical axis indicates a gain and a horizontal axis indicates an operating frequency. In FIG. 4, a vertical axis indicates an operating frequency and a horizontal axis indicates a FB voltage (Vfb).

With a current resonance converter including the transformer T1 and the resonance capacitor C5, the output voltage Vo is controlled by changing the operating frequency. Actually, the operating frequency corresponding to the output voltage Vo in the normal mode is set to a frequency higher than the operating frequency at which the output voltage Vo is maximized. In the example of FIG. 3, the operating frequency corresponding to the output voltage Vo in the normal mode is about 60 kilohertz (kHz). In the standby mode, an operating frequency is controlled from the operating frequency in the normal mode in a direction in which the gain decreases. By doing so, the output voltage Vo is controlled.

The gain of the current resonance converter is given by $$2nVo/Vi$$

where n is the winding ratio of the transformer T1, Vo is an output voltage, and Vi is an input voltage. From this formula, a fall in the output voltage Vo causes the operating point to move to a lower gain and the operating frequency increases. That is to say, when the output voltage Vo is switched from 13 V to 8 V by inputting a low-level standby control signal nml, the operating frequency increases. As indicated I FIG. 4, the operating frequency is inversely proportional to the FB voltage Vfb which is a feedback signal fed back from the secondary side. The term "inversely proportional" used in this case means that as one increases, the other decreases monotonically. That is to say, when a low-level standby control signal nml which designates the lower output voltage Vo (8 V) is inputted, the switching power supply apparatus which output the higher output voltage Vo (13 V) until then goes into a state in which the FB voltage Vfb fed back from the secondary side is low and in which the operating frequency is high. Accordingly, the FB voltage Vfb which controls the operating frequency is monitored. As a result, it turns out that a fall in the output voltage Vo is determined by detecting that the FB voltage Vfb becomes low.

Next, in order to determine whether the load is light or not, a signal proportional to the load is found from a resonance current. When the value of the signal is small, it is possible to determine that the load is light. The signal indicative of the magnitude of the load obtained from the resonance current is found by the use of the load detection circuit 26 of the control IC 112. A concrete method for finding the signal indicative of the magnitude of the load obtained from the resonance current will now be described.

Figure 5:
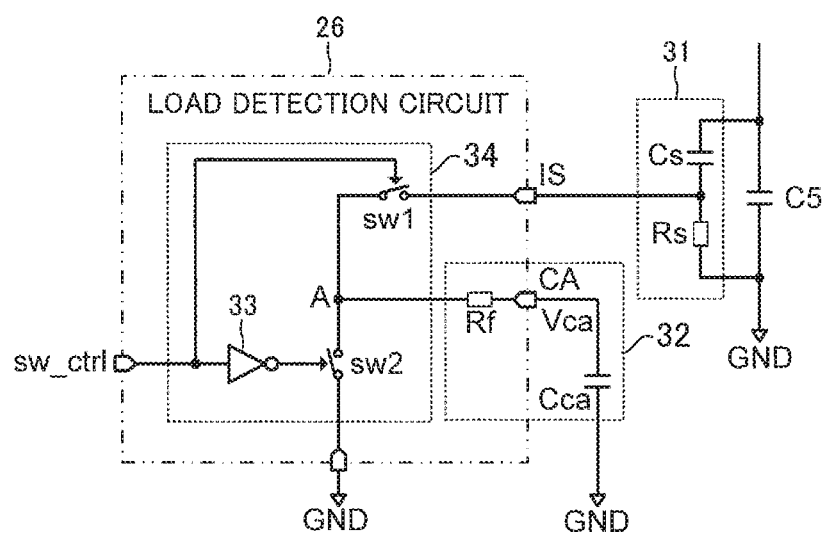
FIG. 5 illustrates an example of the structure of a load detection circuit.

FIG. 5 illustrates an example of the structure of the load detection circuit.

As illustrated in FIG. 5, the load detection circuit 26 includes switches sw1 and sw2 connected in series. One terminal of the switch sw1 is connected to the IS terminal of the control IC 112 and one terminal of the switch sw2 is connected to the GND terminal of the control IC 112. The IS terminal is connected to the connection point common to the capacitor Cs and the resistor Rs. The circuit made up of the capacitor Cs and the resistor Rs connected in series is connected in parallel with the resonance capacitor C5. The capacitor Cs and the resistor Rs make up a shunt circuit 31 which shunts the resonance current. A signal IS obtained by converting the (shunted) resonance current into a voltage signal is inputted to the IS terminal. A connection point A common to the switches sw1 and sw2 is connected to the CA terminal of the control IC 112 via a resistor Rf. An external capacitor Cca is connected to the CA terminal and an averaging circuit 32 including the resistor Rf and the capacitor Cca averages a voltage signal A at the point A. Furthermore, a control terminal of the switch sw1 is connected to a sw_ctrl terminal which receives a signal sw_ctrl from the controller 123 and a control terminal of the switch sw2 is connected to the sw_ctrl terminal via an inverter circuit 33. The switches sw1 and sw2 and the inverter circuit 33 make up a switching circuit 34 and generate the voltage signal A at the point A proportional to an input current by the use of the signal IS and the like.

With the load detection circuit 26 having the above structure, a current supplied by applying the input voltage Vi at the time of the switching element Q1 being on is equal to the sum of a current flowing into the resonance capacitor C5 and a current flowing into the capacitor Cs. On the other hand, when the switching element Q1 is off, a current supplied by applying the input voltage Vi is zero. However, a resonance current also flows into the resonance capacitor C5 and the capacitor Cs at this time. If this resonance current is detected as an input current in this period, a correct input current, or a zero current, is not detected.

Therefore, first the resonance current flowing through the shunt circuit 31 at the time of the switching element Q1 being on is converted into the voltage signal IS by the resistor Rs and is inputted to the load detection circuit 26 via the IS terminal. Furthermore, when the switching element Q1 is off, a signal GND indicative of a potential at the GND terminal is inputted to the load detection circuit 26 via the GND terminal. The signal sw_ctrl which indicates whether the switching element Q1 is on or off is inputted from the controller 123 to the switching circuit 34 and switching control of the switches sw1 and sw2 is exercised by the signal sw_ctrl. As a result, the signal IS is supplied to the point A at the time of the switching element Q1 being on, and the signal GND is supplied to the point A at the time of the switching element Q1 being off. A voltage signal A at the point A is supplied to the averaging circuit 32 and is averaged. A signal Vca is outputted to the CA terminal of the control IC 112. The signal Vca is proportional to the magnitude of the load and is a load signal which accurately reflects the state of the load. Therefore, whether the load is light or not is determined by monitoring the signal Vca.

A concrete example of the standby signal generation circuit 127 will now be described.

Figure 6:
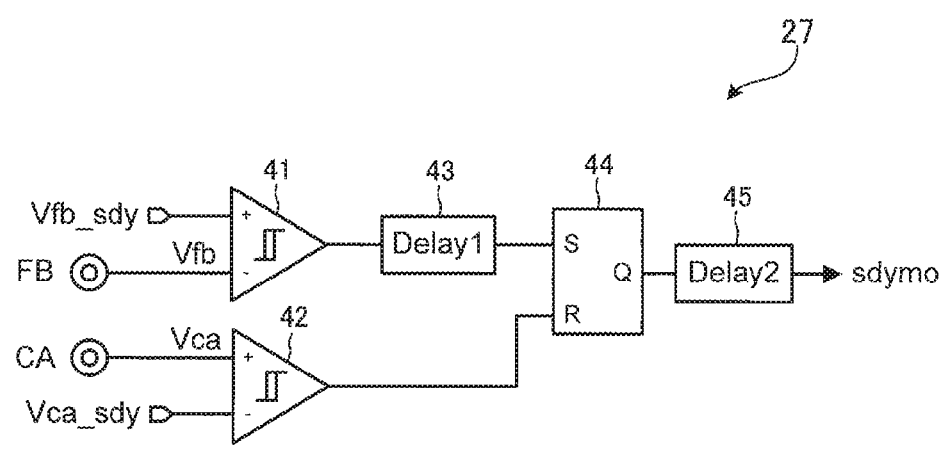
FIG. 6 is a circuit diagram illustrative of an example of a standby signal generation circuit.
Figure 7:
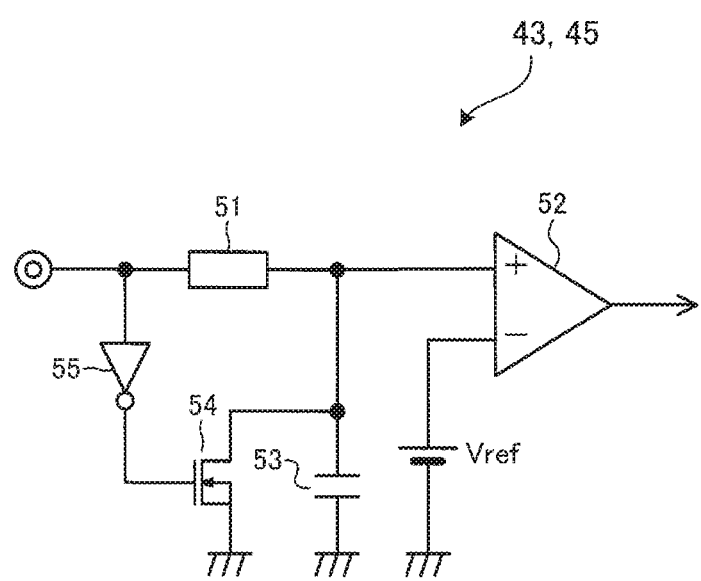
FIG. 7 is a circuit diagram illustrative of an example of a delay circuit.
Figure 8:
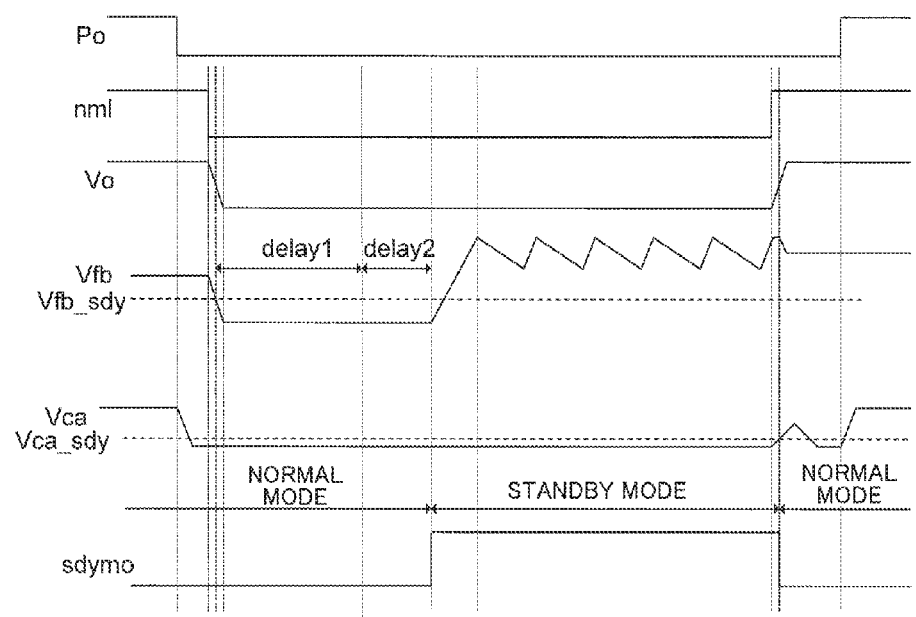
FIG. 8 is a sequence diagram of the operation of the standby signal generation circuit.

FIG. 6 is a circuit diagram illustrative of an example of the standby signal generation circuit. FIG. 7 is a circuit diagram illustrative of an example of a delay circuit. FIG. 8 is a sequence diagram of the operation of the standby signal generation circuit.

The standby signal generation circuit 127 includes comparators 41 and 42, delay circuits 43 and 45, and an RS flip-flop 44. The FB terminal is connected to an inverting input terminal of the comparator 41 and a reference voltage Vfb_sdy which is a threshold for determining the output voltage Vo is inputted to a non-inverting input terminal of the comparator 41. The CA terminal is connected to a non-inverting input terminal of the comparator 42 and a reference voltage Vca_sdy which is a threshold for determining whether the load is light or not is inputted to an inverting input terminal of the comparator 42. The comparators 41 and 42 are preferably hysteresis comparators. An output terminal of the comparator 41 is connected to an input terminal of the delay circuit 43 and an output terminal of the delay circuit 43 is connected to a set terminal of the RS flip-flop 44. An output terminal of the comparator 42 is connected to a reset terminal of the RS flip-flop 44. An output terminal of the RS flip-flop 44 is connected to an input terminal of the delay circuit 45. An output terminal of the delay circuit 45 is an output terminal of the standby signal generation circuit 127 and outputs a standby signal sdymo to the controller 123. The RS flip-flop 44 is a reset dominant flip-flop in which a reset input has priority over a set input (even if a set signal has been inputted to the set terminal, the RS flip-flop 44 is reset when a reset signal is inputted to the reset terminal).

Each of the delay circuits 43 and 45 delays the rising leading edge of an input signal and outputs it. Each of the delay circuits 43 and 45 does not delay the falling trailing edge of an input signal and outputs it. For example, each of the delay circuits 43 and 45 has a structure illustrated in FIG. 7.

In each of the delay circuits 43 and 45, its input terminal is connected via a resistor 51 to a non-inverting input terminal of a comparator 52. One end of a capacitor 53 is connected to a connection point of the resistor 51 and the non-inverting input terminal of the comparator 52. The other end of the capacitor 53 is connected to the ground. The one end of the capacitor 53 is also connected to a drain terminal of a transistor 54. A source terminal of the transistor 54 is connected to the ground. The input terminal is also connected to an input terminal of an inverter circuit 55 and an output terminal of the inverter circuit 55 is connected to a gate terminal of the transistor 54. Furthermore, a reference voltage Vref which is a threshold for determining delay time is inputted to an inverting input terminal of the comparator 52.

In each of the delay circuits 43 and 45, when a low-level signal is inputted to its input terminal, an output of the inverter circuit 55 becomes a high level. As a result, the transistor 54 turns on and the capacitor 53 discharges electric charges. Therefore, the comparator 52 outputs a low-level signal. When a high-level signal is then inputted to the input terminal, an output of the inverter circuit 55 becomes a low level. As a result, the transistor 54 turns off. Accordingly, the capacitor 53 is charged via the resistor 51 by the high-level input signal. A voltage across the terminals of the capacitor 53 gradually rises. If a voltage across the terminals of the capacitor 53 exceeds the reference voltage Vref after the elapse of determined time, the comparator 52 outputs a high-level signal. When a low-level signal is then inputted to the input terminal, an output of the inverter circuit 55 becomes a high level and the transistor 54 turns on. The capacitor 53 instantaneously discharges electric charges. As a result, the comparator 52 outputs a low-level signal without delay at the time when the capacitor 53 discharges electric charges.

The operation of the standby signal generation circuit 127 will now be described with reference to FIG. 8. Description will now be given with a case where the load operates in the normal mode, then shifts to the standby mode, and then returns to the normal mode as an example. Therefore, as indicated in FIG. 8, the power consumption Po of the load is at a high level (heavy load) in the initial normal mode in which all functions of the load operate, and then changes to a low level (light load) in the standby mode in which only part of the functions of the load operate. When finally the load returns to the normal mode, the power consumption Po of the load changes to a high level.

First, when the load operates in the normal mode, the standby control signal nml supplied from the load to the switching power supply apparatus is at a high level. Therefore, the output voltage Vo of the switching power supply apparatus is also at a high level.

When the load then enters the standby mode and the power consumption Po becomes a low level, the signal Vca at the CA terminal of the control IC 112 becomes a low level because it is a load signal indicative of the magnitude of the load. However, the capacitor Cca of the averaging circuit 32 is connected to the CA terminal. Therefore, the signal Vca falls slowly. Unlike the power consumption Po, the signal Vca does not change suddenly. At this point of time the standby control signal nml remains at the high level.

The signal Vca is inputted to the CA terminal of the standby signal generation circuit 127. If the voltage value of the signal Vca is smaller than the reference voltage Vca_sdy, the comparator 42 outputs a low-level signal to the reset terminal of the RS flip-flop 44. That is to say, a state in which a reset signal is not inputted to the RS flip-flop 44 arises. Because at this time a high-level FB voltage Vfb is inputted to the FB terminal, the comparator 41 outputs a low-level signal. This low-level signal passes through the delay circuit 43 and is inputted to the set terminal of the RS flip-flop 44. That is to say, a state in which a set signal is not inputted to the RS flip-flop 44 either arises. Therefore, the RS flip-flop 44 still outputs a low-level signal. This low-level signal passes through the delay circuit 45 and becomes a low-level standby signal sdymo which means the normal mode.

After the load becomes light, the load then outputs a low-level standby control signal nml. When this low-level standby control signal nml is received, the output voltage Vo is switched from the high level (13 V) to the low level (8 V) and the FB voltage Vfb at the FB terminal of the control IC 112 falls. Because the large-capacitance output capacitor C6 is used, the output voltage Vo does not fall suddenly but falls with a gradient.

When the FB voltage Vfb falls and becomes lower than the reference voltage Vfb_sdy, the comparator 41 outputs a high-level signal. This high-level signal is inputted to the delay circuit 43. When the high-level signal is inputted to the delay circuit 43, the inverter circuit 55 turns off the transistor 54. As a result, the capacitor 53 is charged via the resistor 51. If a voltage across the terminals of the capacitor 53 exceeds the reference voltage Vref after the elapse of delay time delay1, the comparator 52 outputs a high-level signal. This high-level signal is inputted to the set terminal of the RS flip-flop 44. As a result, the RS flip-flop 44 outputs a high-level signal. This high-level signal is inputted to the delay circuit 45. When the high-level signal is inputted to the delay circuit 45, the delay circuit 45 outputs a high-level signal as the standby signal sdymo after the elapse of delay time delay2. When the controller 123 of the control IC 112 receives the standby signal sdymo, the controller 123 operates in the standby mode.

When the controller 123 enters the standby mode, the controller 123 exercises control in various ways. For example, when the load is light, the controller 123 causes intermittent oscillation. That is to say, the controller 123 exercises what is called burst control. For example, when the controller 123 enters the standby mode, the FB voltage Vfb rises. When the FB voltage Vfb rises to a determined voltage, the controller 123 begins to perform switching. When the FB voltage Vfb falls to a determined voltage, the controller 123 stops switching. This operation is repeated. At the time when the FB voltage Vfb first rises above the reference voltage Vfb_sdy, a low-level signal is inputted to the set terminal of the RS flip-flop 44. However, a low-level signal is also inputted to the reset terminal of the RS flip-flop 44. Therefore, the standby signal sdymo which is an output of the RS flip-flop 44 remains at a high level which means the standby mode.

After that, when the standby control signal nml from the load becomes a high level (at this point of time, the load merely switches the standby control signal nml and its power consumption Po remains at a low level), switching is performed so as to raise the output voltage Vo, and the FB voltage Vfb also rises. When the FB voltage Vfb rises, the controller 123 begins to perform switching. At this time the signal Vca at the CA terminal transiently rises. At this time the load is still light. Therefore, this rise in the signal Vca is caused not by the original load but by a load which transiently increases at the time of increasing a charging voltage of the output capacitor C6 from 8 V to 13 V. When the signal Vca transiently rises above the reference voltage Vca_sdy, the load is transiently considered heavy. As a result, the RS flip-flop 44 is reset and the standby signal sdymo becomes a low level. Therefore, the controller 123 returns to the normal mode.

When the controller 123 returns to the normal mode, the load still remains light. Accordingly, the signal Vca at the CA terminal soon falls. When the signal Vca at the CA terminal soon falls below the reference voltage Vca_sdy and the influence of the transient phenomenon which occurs at the time of increasing a charging voltage of the output capacitor C6 from 8 V to 13 V disappears, preparation for the supply of power to the load is finished. When the load really returns to the normal mode in this state by making all the functions available, the power consumption Po becomes a high level.

As has been described, when a request for the standby mode is made by the load, the control IC 112 monitors by the FB voltage Vfb an operating frequency at the time of the output voltage Vo being switched from a high level to a low level, and monitors the state of the load by the signal Vca at the CA terminal in which the state of the load is reflected. If the determination that the operating frequency is high is made on the basis of the FB voltage Vfb and the determination that the load is light is made on the basis of the signal Vca at the CA terminal, then the control IC 112 switches from the normal mode to the standby mode after the elapse of certain delay time. On the other hand, if the determination that a load is transiently heavy is made in the standby mode, then the control IC 112 switches from the standby mode to the normal mode at that point of time. Because the FB voltage Vfb and the signal Vca are monitored on the primary side of the switching power supply apparatus, a circuit element which transmits notice of the standby mode from the secondary side to the primary side is unnecessary. In addition, because the control IC 112 does not need a terminal used for a standby control signal, the control IC 112 may use the terminal for another function.

With the switching power supply apparatus having the above structure, a standby control signal is detected indirectly in the control circuit. As a result, a circuit which transmits a standby control signal from the secondary side to the primary side is unnecessary. Therefore, the switching power supply apparatus having the above structure has the advantage of a reduction in the costs.

If the control circuit is made an IC, an input terminal for a standby control signal is unnecessary. A reduction in the number of terminals by one is a great advantage in designing and manufacturing ICs. Furthermore, making a terminal used for a standby control signal unnecessary means that a new function which needs a terminal is added to an IC. This improves the functions of the IC.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A switching power supply apparatus comprising:
   a first switching element and a second switching element connected in series;
   a circuit made up of a resonance reactor and a resonance capacitor connected in series to each other and connected in parallel with the first switching element or the second switching element;
   a control circuit that controls an output voltage to be supplied to a load by changing an operating frequency at which switching of the first switching element and the second switching element is performed;
   a feedback circuit that feeds back to the control circuit an error between the output voltage and a reference voltage; and
   a mode switching circuit that switches the output voltage to a first voltage in a normal mode or a second voltage in a standby mode lower than the first voltage by a standby control signal supplied from the load,
   wherein the control circuit includes a standby signal generation circuit that monitors the operating frequency and a load signal generated from a resonance current and reflecting a magnitude of the load and that generates a standby signal for performing switching of the normal mode or the standby mode according to the operating frequency and the load signal.

2. The switching power supply apparatus according to claim 1, wherein the standby signal generation circuit determines, at the time of the operating frequency being higher than a first threshold and the load signal being smaller than a second threshold, that the output voltage is switched from the first voltage to the second voltage, and sets the standby signal to the standby mode.

3. The switching power supply apparatus according to claim 2, wherein the standby signal generation circuit sets the standby signal to the standby mode determined time after the standby signal generation circuit determines that the output voltage is switched from the first voltage to the second voltage.

4. The switching power supply apparatus according to claim 1, wherein when the load signal exceeds a second threshold in the standby mode, the standby signal generation circuit determines that the output voltage is switched from the second voltage to the first voltage, and sets the standby signal to the normal mode.

5. The switching power supply apparatus according to claim 1, wherein the standby signal generation circuit monitors the operating frequency by the use of a feedback signal fed back by the feedback circuit and inversely proportional to the operating frequency.

6. The switching power supply apparatus according to claim 1, wherein the standby signal generation circuit includes a first comparator which compares a feedback signal fed back by the feedback circuit and inversely proportional to the operating frequency with a first threshold, a second comparator which compares the load signal with a second threshold, a first delay circuit which delays only a rising leading edge of a signal outputted by the first comparator for determined time at the time of the feedback signal falling under the first threshold, an RS flip-flop having a set terminal to which an output of the first delay circuit is connected and a reset terminal which receives a signal outputted by the second comparator at the time of the load signal falling under the second threshold, and a second delay circuit which delays only a rising leading edge of a signal outputted by the RS flip-flop for determined time.

7. The switching power supply apparatus according to claim 6, wherein:
 a reset input has priority over a set input in the RS flip-flop; and
 at least one of the first comparator and the second comparator is a comparator having a hysteresis characteristic.

8. The switching power supply apparatus according to claim 1,
 wherein the load signal is obtained by:
 inputting a current signal obtained by shunting the resonance current and performing averaging at the time of the first switching element or the second switching element not connected in parallel with the circuit made up of the resonance reactor and the resonance capacitor connected in series being on; and
 inputting a ground-level signal and performing averaging at the time of the first switching element or the second switching element not connected in parallel with the circuit made up of the resonance reactor and the resonance capacitor connected in series being off.

9. A switching power supply apparatus comprising:
 a first switching element and a second switching element connected in series;
 a circuit made up of a resonance reactor and a resonance capacitor connected in series to each other and connected in parallel with the first switching element or the second switching element;
 a control circuit that controls an output voltage to be supplied to a load by changing an operating frequency at which switching of the first switching element and the second switching element is performed;
 a feedback circuit that feeds back to the control circuit an error between the output voltage and a reference voltage; and
 a mode switching circuit that switches the output voltage to a first voltage in a normal mode or a second voltage in a standby mode lower than the first voltage by a standby control signal supplied from the load,
 wherein the control circuit includes a standby signal generation circuit, an oscillation circuit, a load detection circuit, and a controller,
 wherein the control circuit includes a feedback input terminal connected to the standby signal generation circuit and the oscillation circuit to provide to the standby signal generation circuit and the oscillation circuit the error between the output voltage and the reference voltage,
 wherein the control circuit includes a load detection terminal connected to the load detection circuit and the standby signal generation circuit to provide a load signal generated from a resonance current and reflecting a magnitude of the load to the load detection circuit and the standby signal generation circuit, and
 wherein the controller generates a standby signal for performing switching of the normal mode or the standby mode based on outputs from the standby signal generation circuit according to the operating frequency and the load signal.

* * * * *